United States Patent [19]

McConnell et al.

[11] Patent Number: 4,976,812
[45] Date of Patent: Dec. 11, 1990

[54] IN-LINE CONSOLIDATION OF BRAIDED STRUCTURES

[75] Inventors: Ronald F. McConnell, West Chester, Pa.; Peter Popper, Wilmington, Del.

[73] Assignee: E. I. Du Pont de Nemours and Company, Wilmington, Del.

[21] Appl. No.: 449,100

[22] Filed: Dec. 4, 1989

Related U.S. Application Data

[63] Continuation of Ser. No. 151,582, Feb. 2, 1988, abandoned.

[51] Int. Cl.$^5$ .................... B29C 65/02; D04C 1/14; D04C 3/00
[52] U.S. Cl. ........................... 156/148; 87/9; 87/34; 156/322; 156/393
[58] Field of Search ............. 156/148, 149, 169, 173, 156/175, 180, 393, 441, 320, 322; 87/1, 7, 8, 9, 23, 33, 34; 264/103, 135, 136

[56] References Cited

U.S. PATENT DOCUMENTS

| | | | |
|---|---|---|---|
| 787,383 | 4/1905 | Klein | 87/34 |
| 2,025,038 | 12/1935 | Cannon | 96/3 |
| 2,257,649 | 9/1941 | Pierce | 96/26 |
| 2,344,181 | 3/1944 | Stone | 87/1 |
| 2,810,424 | 10/1957 | Swartsuelter et al. | 156/393 X |
| 3,022,802 | 2/1962 | Lewis | 138/125 |
| 3,079,978 | 3/1963 | Cobb et al. | 156/180 X |
| 3,255,614 | 6/1966 | Kennitz | 66/192 |
| 4,010,054 | 3/1977 | Bradt | 156/187 X |
| 4,058,581 | 11/1977 | Park | 264/136 |
| 4,260,143 | 4/1981 | Kliger | 267/148 |
| 4,380,483 | 4/1983 | Kliger | 156/169 |
| 4,512,836 | 4/1985 | Tucci | 156/174 |
| 4,549,920 | 10/1985 | Cogswell et al. | 156/181 |
| 4,626,306 | 12/1986 | Chabrier et al. | 156/180 |
| 4,719,837 | 1/1988 | McConnell et al. | 87/1 |
| 4,891,179 | 1/1990 | Peacock et al. | 264/166 |

FOREIGN PATENT DOCUMENTS

| | | |
|---|---|---|
| 0206591 | 12/1986 | European Pat. Off. |
| 57-071107 | 5/1982 | Japan |
| 2113140 | 8/1983 | United Kingdom ............... 156/180 |
| 2204888 | 11/1988 | United Kingdom |

OTHER PUBLICATIONS

SPIFLEX The Advance Composite Material Brochure, 1985.

Primary Examiner—Michael W. Ball
Assistant Examiner—Steven D. Maki

[57] ABSTRACT

A braided insitu consolidated structure of fiber reinforced thermoplastic resin strands is formed by braiding the strands on a mandrel and then advancing the mandrel and the braided structure as it is formed continuously through a heating zone to heat the resin to a flowable condition then cooling the structure as it leaves the zone. Pressure may be applied or developed against the braided structure during its formation.

2 Claims, 6 Drawing Sheets

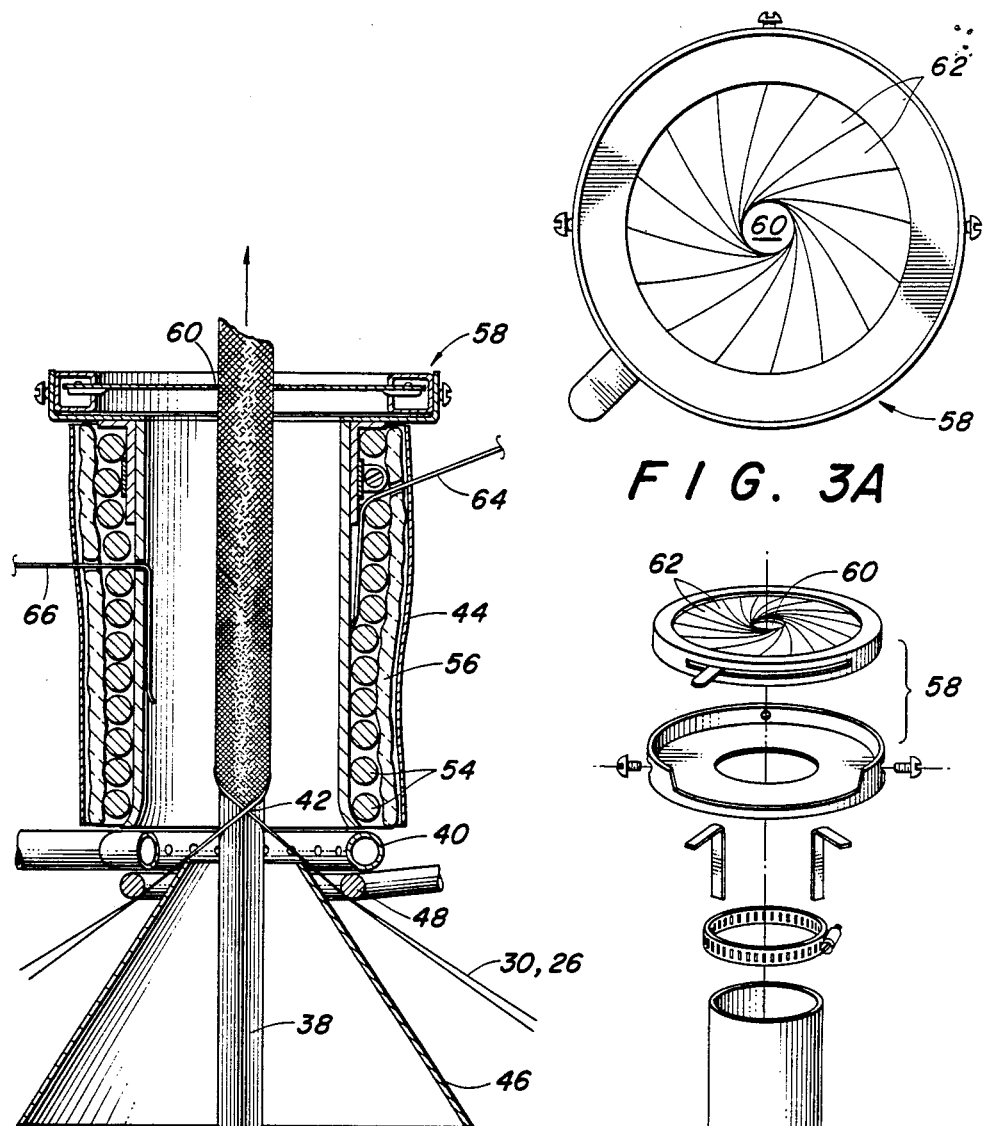
FIG. 3
FIG. 3A
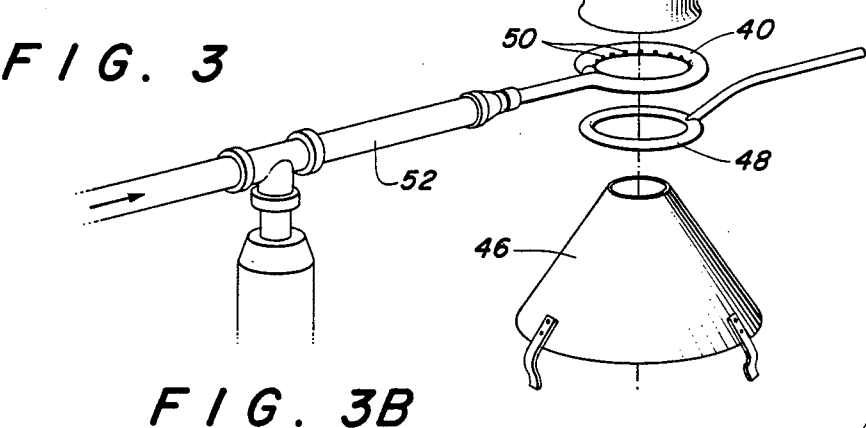
FIG. 3B

IN-LINE CONSOLIDATION OF BRAIDED STRUCTURES

This application is a continuation-in-part of application Ser. No. 07/151,582 filed Feb. 2, 1988, now abandoned.

BACKGROUND OF THE INVENTION

This invention relates to complex shaped structures and more particularly it relates to braided structures of fiber reinforced thermoplastic strands.

Fiber-reinforced plastic structures have been used for many years with increasing success because of their high strength, light weight and ease of fabrication compared to the wood or metal structures which they replace. Fibers such as glass, carbon, ceramic and aramid are popular as reinforcement, and thermoplastic resins are common polymeric matrices.

Braiding is one process for producing such structures and generally comprises forming an array of yarns extending substantially parallel to the axis of the structure and interlacing the yarns in a pattern through the array so they are interlaced with one another.

Polymeric materials reinforced with continuous filaments are used a precursors for highly-stressed parts such as aerospace components requiring the highest possible strength and stiffness with the lowest possible weight. When a composite preform is made with both reinforcing fibers and a matrix material, it must be consolidated in a subsequent step such as molding to form the final product. This consolidation process generally reduces the volume of the preform as air is removed and develops local crimp in the reinforcing fibers. Crimped fibers provide less reinforcement than straight ones and thereby reduce the strength and stiffness of the composite product.

SUMMARY OF THE INVENTION

According to the present invention, an insitu consolidated braided composite structure (i.e., the i ability to consolidate the structure during braiding without the need of consolidation processing after braiding) is constructed from a plurality of lengths of fiber reinforced thermoplastic resin strands braided on a mandrel. The strands are advanced toward the mandrel and converged under tension in a braiding pattern around a location on the mandrel to form a braided structure thereon. The braided structure is advanced through a heating zone as the braided structure is being formed where it is heated to a temperature that permits the thermoplastic resin to flow but below the degradation temperature of the resin as the structure advances through the heating zone. The braided structure is cooled as it leaves the zone. In an alternate process, pressure may be applied by passing the braided structure through a heated die. The pressure which develops depends on the size of die or type of components used. This in-line consolidation process provides a braided composite part with a very low percentage of local crimp present in the reinforcing fibers of the part thus enhancing the stiffness and strength of the product. Using the procedures described herein local crimp for circular braided composite structures can be held to less than 3 percent or even less than 1 percent and for three dimensional braided composite structures prepared by the two-step braiding process described in USSN 853742, filed Apr. 17, 1986, can be held to less than 10 percent or even less than 3 percent.

BRIEF DESCRIPTION OF THE DRAWINGS

FIG. 3 is a cross-sectional view taken along line 3—3 of FIG. 1.

FIG. 3a is a plan view of the adjustable heating chamber exit of the unit shown in FIG. 3.

FIG. 3b is an exploded view of the consolidation unit of FIG. 3.

DETAILED DESCRIPTION OF THE DRAWINGS

Figure 1:
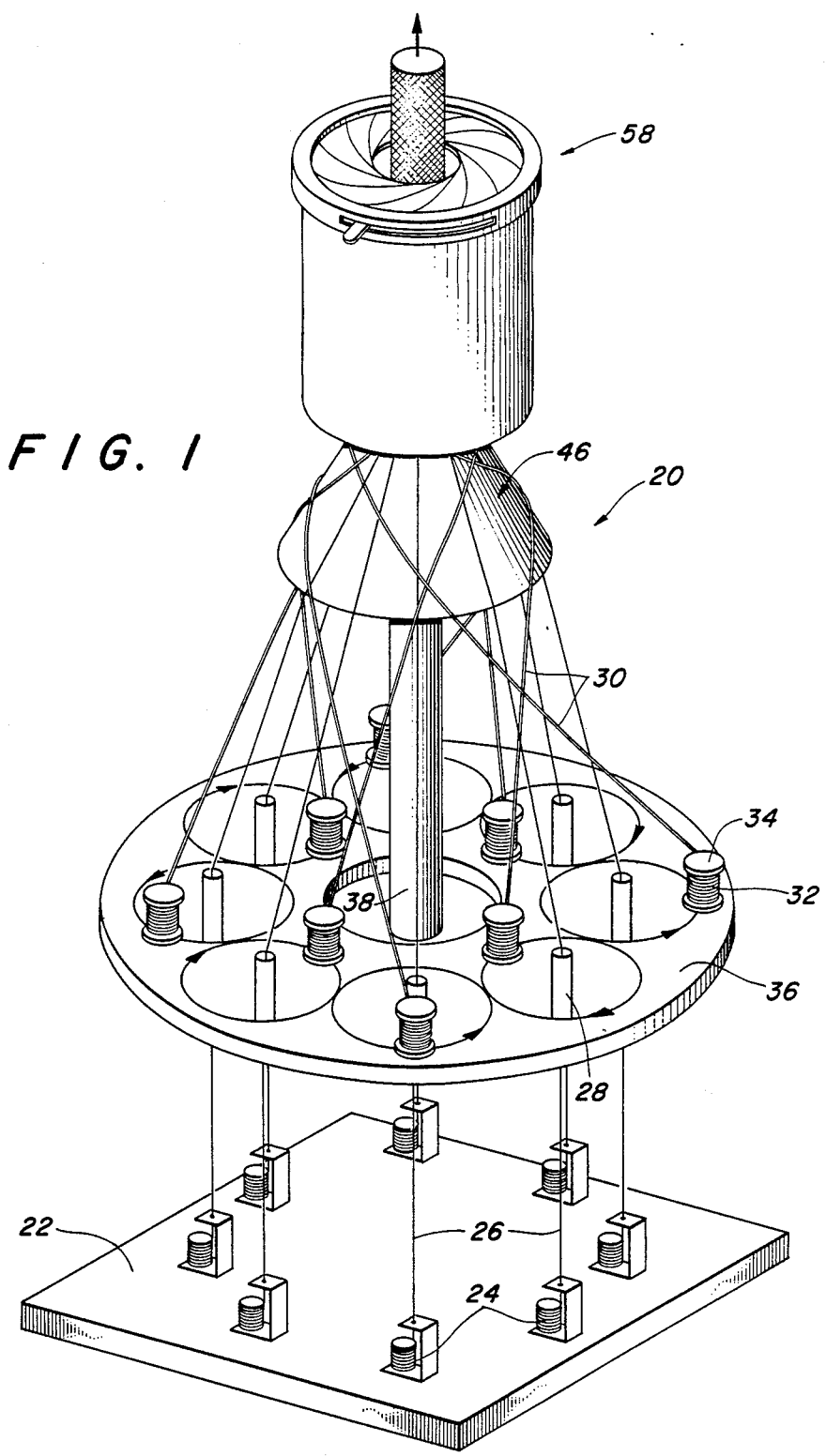
FIG. 1 is a schematic view in perspective of circular braiding apparatus useful in practicing the invention and an associated consolidation unit.

Referring to FIG. 1, a circular braiding machine (manufactured by Wardell Braiding Machine Co., Model No. W-38-53 equipped with #2 carriers) generally designated 20 is fed from a creel 22 supporting supply packages 24 of axial yarns 26 which are moved through guide tubes 28. Braiding yarns 30 are fed from supply packages 32 mounted on carriers 34 which are movable in face plate 36 (as indicated by arrows) by a horn gear mechanism (not shown). As shown in FIGS. 3, 3a and 3b, axial yarns 26 and braiding yarns 30 are braided over a shaped mandrel 38 as heat is supplied in the form of heated nitrogen through nitrogen injector ring 40 just before convergence point 42 which is surrounded by heating chamber 44. At the entrance to the heating chamber 44, the braiding yarn array is guided from below by a funnel guide 46 and from above by guide ring 48. The funnel guide 46 is also used to minimize hot gas leakage. The nitrogen injector ring 40 has exit holes 50 directing the flow of nitrogen gas which has been heated by nitrogen heater 52 towards the braiding array. The heating chamber 44 is made of a stainless steel cylinder wrapped with electrical heating coils 54 and fiberglass insulation 56. At the exit of heating chamber 44 is a mechanical device 58 with an adjustable orifice 60. The orifice size is adjusted by rotating the angular position of a number of leaf elements 62. The heating chamber wall temperature is measured by thermocouple 64 and temperature of the interior of the heating chamber is measured by thermocouple 66.

Figure 2:
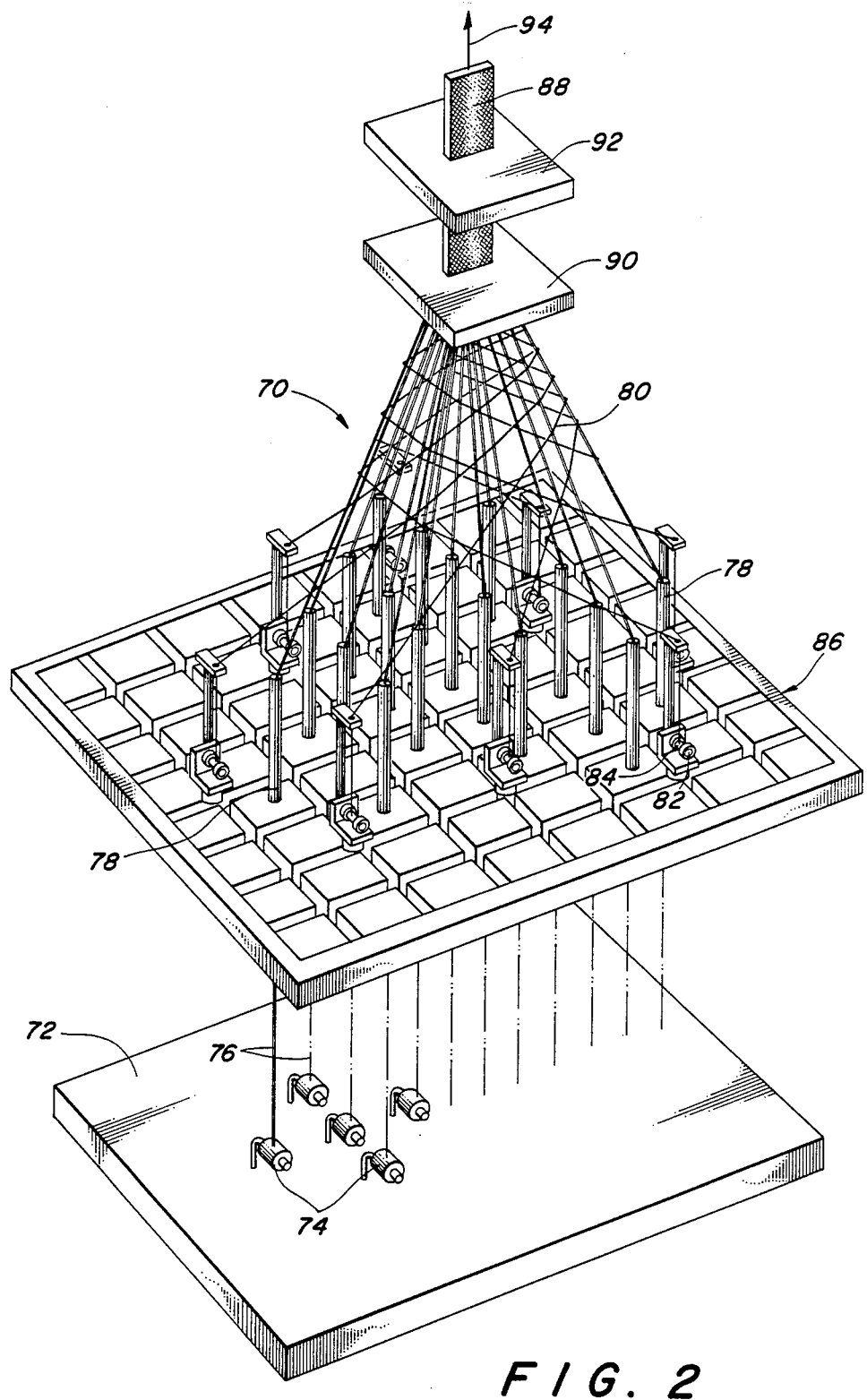
FIG. 2 is a schematic view in perspective of another braiding apparatus useful in practicing the invention and an associated consolidation unit.

Referring to FIG. 2, a 3D braiding machine (as disclosed in US Patent Application Serial No. 853,742) generally designated 70 is fed from a creel 72 supporting supply packages 74 of axial yarns 76 which are moved through guide tubes 78. Braiding yarns 80 are fed from supply packages 82 mounted on carriers 84 which are movable in grid support 86. The axial yarns 76 and braiding yarn 80 form a braided structure 88 in specified cross-sectional shape which is pulled first through heating die 90 and then through cooling die 92 by a puller mechanism indicated by arrow 94.

Figure 4:
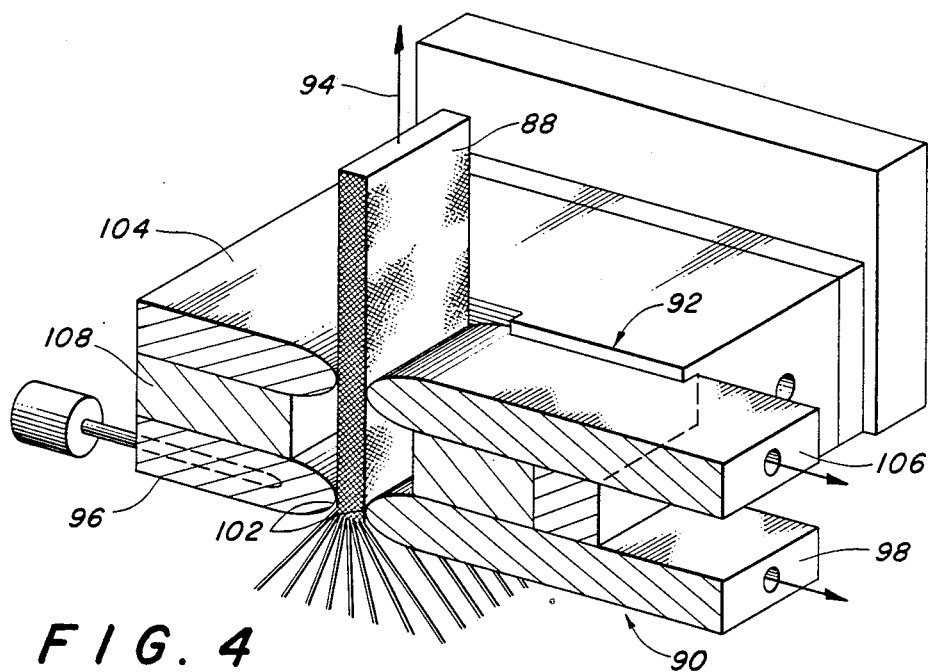
FIG. 4 is a drawing of the consolidation unit of FIG. 2 partially broken away to show the relationship of the braided structure to the internal plates of the unit.
Figure 4A:
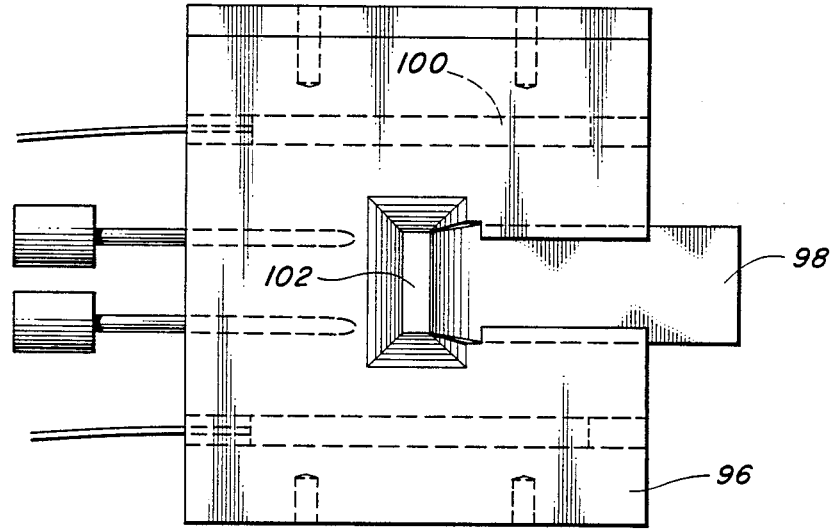
FIG. 4a is a plan view of the consolidation unit of FIG. 4.

As shown in FIGS. 4 and 4a, the heated die 90 which is positioned at the convergence point of the braiding yarns is composed of a stationary plate 96 and a moving plate 98. The stationary plate has a pair of cartridge heaters 100 and a pair of thermocouples 101 incorporated therein. The moving plate 98 and the stationary plate 96 form an orifice 102 which matches the specified cross-sectional shape of braided structure 88. The cooling die 92 is similarly composed of a stationary plate 104 and a moving plate 106. Cooling #coils (not shown) are inserted into the stationary plate of the cooling die in lieu of cartridge heaters. Thermal insulation 108 is positioned between the two dies. The moving plates in both dies may be vibrated by mechanical or hydraulic means (not shown) to vary the die pressure against the braided structure 88 which lessens the pulling force requirement.

In operation, the dieless process described by FIGS. 1, 3, 3a, and 3b, braiding yarns and axial yarns are impregnated with a thermoplastic matrix which matrix will soften and flow at a temperature which is below that which would cause the yarns to soften and flow. It is to be noted that the braiding yarns and the axial yarns may differ in composition. The temperature imposed by the hot gas and the heating chamber must be sufficient to cause the matrix to flow. The pressure which develops from the yarn tension and mandrel curvature must be adequate to fuse the yarns together.

In a heated die process, described by FIGS. 2, 4, and 4a, braiding yarns and axial are similarly impregnated with a thermoplastic matrix. The temperature imposed by the heating die must be sufficient to melt the matrix only. The pressure exerted by the die must be adequate to consolidate the sample. The cooling die preserves the imposed cross-sectional shape by solidifying the matrix.

Method for Determining Local Crimp

Definitions:

Braid — An interlaced fabric composed of braiding yarns and in some cases axial yarns.

Axial Yarn — One of a number of yarns which pass lengthwise through the braid and do not interlace each other.

Braider — One of a number of yarns which interlace each other and pass through the braid in an irregular helix.

3D Braid — A braided multilayer fabric in which braiders pass completely through the thickness.

Braided Composite — A rigid structure made of a braid in which a large portion of the spaces between the yarns are filled with a matrix material.

The local-crimp can be defined as the fractional length difference between an actual yarn and a reference path. Usually this reference path is taken to be a straight line oriented in the yarn direction. In complex shaped braided structures which can be layered or three dimensional (3D), the definition of a reference line must be generalized to include all possibilities. For example, for circular braids, a projected yarn path is measured for one circumference. This path could be quite circuitous in some cases even if the local crimp level is low.

For this reason, the crimp is determined by comparing the length of the yarn projection to a smoothed reference curve. This reference curve is computed by taking a moving average of the projected yarn path. A window width of 20% of the perimeter is used in this computation. The projection is taken on an irregular cylindrical surface which comes as close as possible to the structure. By this procedure, the local crimp of any shaped part can be determined. Note that since the lengths are measured along a projected length, they are not the same as along the actual yarn.

For 3D braids, the crimp is determined by cutting a cross-section which includes a braiding yarn passing completely through the structure. The local crimp is measured from the actual yarn length and a straight line connecting the end points.

Circular Braided Composites

1. Plot Graph of Projected Path of One Braider
   a. Roll a transparent sheet around the composite. The sheet should remain in the form of an irregular cylinder or prism which comes as close as possible to the composite.
   b. Mark the projected yarn path of one braider on the transparent sheet. The resulting graph shows the axial position "Y" vs. circumferential position "X" of the projected path. (Include 20% more than one circumference and identify the points which correspond to the start and end of one circumference or perimeter "P".) The prism or cylinder is then developed into a flat sheet where the path can be measured.

2. Plot a Smoothed Reference Path
   a. Compute the reference path from the projected yarn path at each point by averaging "Y" over 20% of the circumference (from $X-0.1*P$ to $X+0.1*P$).

3. Measure Path Lengths and Crimp
   a. Measure the lengths of the projected yarn path and the reference path (designated Lp and Lr respectively).
   b. Compute the crimp (C) from $$(C = Lp/Lr - 1)$$

Figure 7:
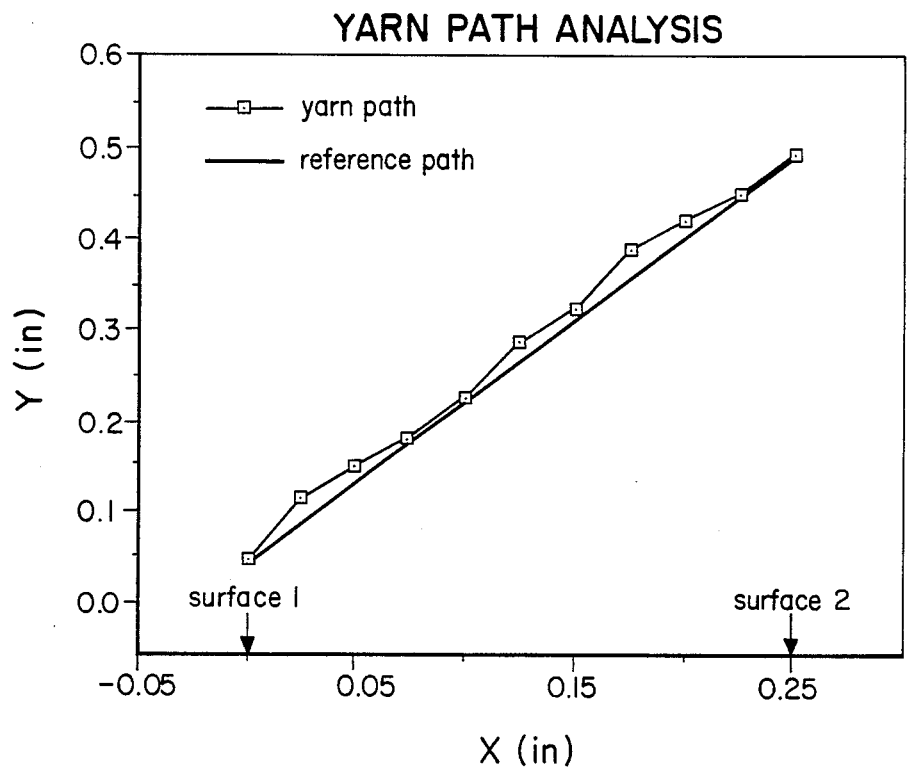
FIG. 7 is a graph of the path and reference path of a single braiding yarn from the braided structure of Example II.
Figure 7A:
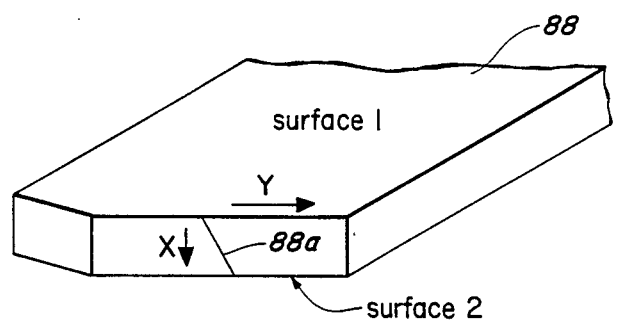
FIG. 7A is a schematic of the composite from Example III as prepared for conducting the test method for determining local crimp.

3D Braided Composites (FIGS. 7, 7A)

1. Plot Path of Braider Through the Thickness of a Composite
   a. Cut a cross-section of the composite 88 at an angle which includes the path of a single braiding yarn passing completely through the material.
   b. Plot the path of the braider by plotting its in-plane position "Y" vs. its through-the-thickness position "X".

2. Plot the Reference Path
   a. Draw a straight line 88a through the sample thickness that connects the end points of the braider path.

3. Measure Path Lengths and Crimp
   a. Measure the lengths of the yarn path and the reference path (designated Lp and Lr respectively).
   b. Compute the crimp (C) from $$(C = Lp/Lr - 1)$$

EXAMPLE I

A cylindrical tube structure is prepared by providing 16 groups of axial yarns and 32 braiding yarns of Kevlar ® 49 fiber (manufactured by E. I. du Pont de Nemours and Company) melt impregnated with Kodar PETG Copolyesters 673 (Eastman Chemical Products, Inc.) of total denier 4309 where the fiber volume fraction is 0.5. The yarns are braided over a circular shaped mandrel, formed from solid aluminum, with a 0.5" diameter. The convergence half angle (angle between convergence cone and machine centerline) is 66°. The heating chamber length is 4 inches and its diameter is 2 inches. The temperature of the nitrogen as supplied was 386° C. and the wall temperature of the chamber was 430° C. The temperature within the chamber was 370° C. The maximum temperature between layers was determined to be 204° C. The axial velocity of the braided structure was maintained at 5 in/min. The tension of both axial and braiding yarns was set to approximately 0.5 lb. After braiding a layer, the yarns were cut and the resulting structure with the internal mandrel was overbraided using the same process. A total of 5 layers were formed.

EXAMPLE II

Figure 5:
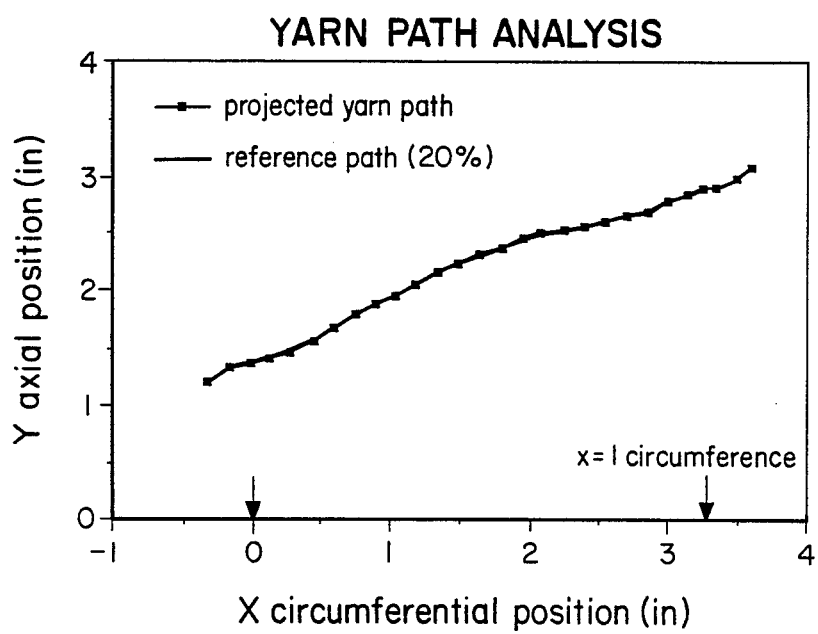

A rectangular hollow circular braided structure was prepared under the same conditions as Example I with the exceptions that a rectangular shaped mandrel formed from solid aluminum having the dimensions 0.65" by 0.728" was used and that no axial yarns were provided. A total of 5 layers were formed. Local crimp was determined to be 0.6 percent using the yarn path analysis as shown in FIG. 5.

Figure 6:
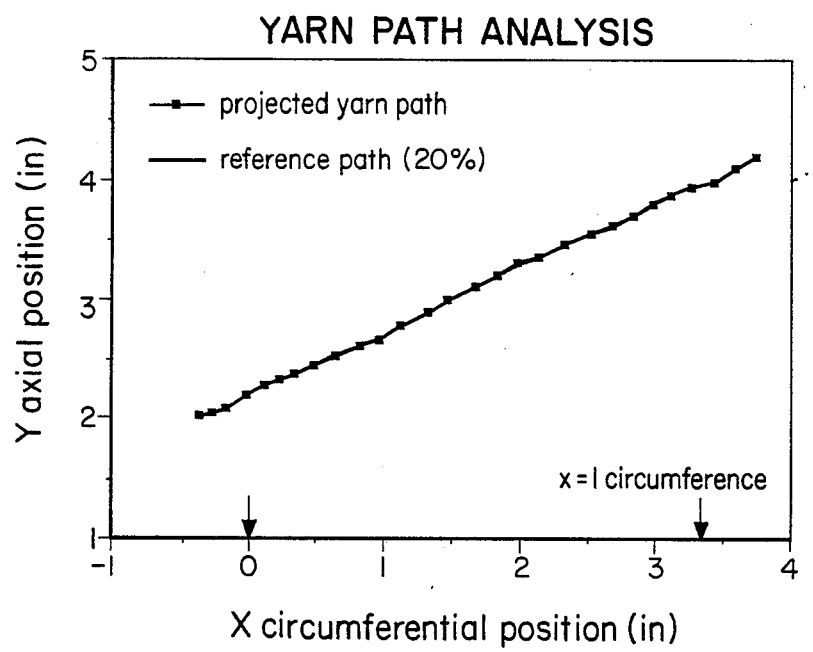
FIGS. 5 and 6 are graphs of the projected path and reference path of one braider yarn from the braided structure of Example II with in-line consolidation and in-line consolidation plus post consolidation, respectively.

The above on-line consolidated structure was further post consolidated by heating at 220° C. for 15 minutes with a pressure of 425 psi. Local crimp was determined to be 0.2 percent using the yarn path analysis as shown in FIG. 6.

EXAMPLE III

A rectangular slab is prepared by providing (1) 38 groups of axial yarns of AS-4 carbon fibers (3KAS4W Hercules Magnamite®) melt impregnated with an amorphous polyamide, the method of which is described in Binnersley, et al., USP 4,640,681, where the fiber volume fraction is 0.5 and (2) 11 braiding yarns of Kevlar 49 fiber (manufactured by E. I. du Pont de Nemours and Company) melt impregnated with the same polyamide composition as described for the axial yarns where the fiber volume traction is 0.5. The total number of axial yarns provided is 502, each yarn having a weight per length, including fiber and matrix, of 3300 denier. The 11 braiding yarns have a weight per length, including fiber and matrix, of 4200 denier. The braided structure is prepared by the two-step process detailed in USSN 853,742 filed Apr. 17, 1986. The temperature of the heated die was 300° C. and the cooling die was 104° C. The die pressure in both dies was 1256 psi; however, the pressure in the heated die was cycled between 0 and 1256 psi by oscillating the moving plates with a hydraulic system. Because the yarns were manually manipulated, axial velocity of the braided structure was slow.

The above on-line consolidated structure was further post consolidated to obtain full consolidation by heating at 310° C. for 20 minutes with a pressure of 600 psi. Local crimp was determined to be 0.7 percent as determined by the yarn path analysis shown in FIGS. 7, 7A.

We claim:

1. A method of building and consolidating a composite structure from melt impregnated fiber reinforced thermoplastic resin strands comprising: advancing said strands toward a mandrel;; converging said strands under tension in a braiding pattern around a location on said mandrel to form a braided composite structure thereon; heating said strands to a temperature which will cause the thermoplastic resin to soften and flow prior to their contacting the mandrel for braiding around said location; advancing said braided structure while continuing to heat said structure to cause continuing softening and flow as the structure advances, said temperature being below the degradation temperature of the resin; and cooling said structure.

2. The method of claim 1 wherein said structure is heated in an inert atmosphere.

* * * * *